(12) United States Patent
Verslegers et al.

(10) Patent No.: US 11,143,816 B2
(45) Date of Patent: Oct. 12, 2021

(54) METHOD AND SYSTEM FOR STABILIZED DIRECTIONAL COUPLERS

(71) Applicant: Luxtera LLC., Wilmington, DE (US)

(72) Inventors: Lieven Verslegers, La Jolla, CA (US); Steffen Gloeckner, San Diego, CA (US); Adithyaram Narasimha, Carlsbad, CA (US); Attila Mekis, Carlsbad, CA (US)

(73) Assignee: Luxtera LLC, Wilmington, DE (US)

( * ) Notice: Subject to any disclaimer, the term of this patent is extended or adjusted under 35 U.S.C. 154(b) by 15 days.

(21) Appl. No.: 16/460,471

(22) Filed: Jul. 2, 2019

(65) Prior Publication Data

US 2019/0324199 A1    Oct. 24, 2019

Related U.S. Application Data

(63) Continuation of application No. 14/105,328, filed on Dec. 13, 2013, now Pat. No. 10,338,309.

(60) Provisional application No. 61/797,692, filed on Dec. 13, 2012.

(51) Int. Cl.
| | |
|---|---|
| *G01B 9/02* | (2006.01) |
| *G02B 6/122* | (2006.01) |
| *G02B 6/42* | (2006.01) |
| *G02B 6/12* | (2006.01) |

(52) U.S. Cl.
CPC ............ *G02B 6/122* (2013.01); *G01B 9/02* (2013.01); *G01B 9/0201* (2013.01); *G02B 6/4215* (2013.01); *G02B 2006/12147* (2013.01)

(58) Field of Classification Search
CPC ................................ G01B 9/02; G01B 9/0201
See application file for complete search history.

(56) References Cited

U.S. PATENT DOCUMENTS

| | | | | |
|---|---|---|---|---|
| 4,552,457 A * | 11/1985 | Giallorenzi | ........ | G01D 5/35303 250/227.19 |
| 5,117,470 A * | 5/1992 | Inoue | ..................... | G02B 6/122 385/1 |
| 5,247,594 A * | 9/1993 | Okuno | ................... | G02B 6/125 385/16 |
| 6,453,086 B1 * | 9/2002 | Tarazona | .............. | G02F 1/0134 385/20 |

(Continued)

*Primary Examiner* — Charlie Y Peng
(74) *Attorney, Agent, or Firm* — Patterson + Shendan, LLP

(57) ABSTRACT

Methods and systems for stabilized directional couplers are disclosed and may include a system comprising first and second directional couplers formed by first and second waveguides, where one of the waveguides may comprise a length extender between the directional couplers. The directional couplers may be formed by reduced spacing between the waveguides on opposite sides of the length extender. An input optical signal may be communicated into one of the waveguides, where at least a portion of the input optical signal may be coupled between the waveguides in the first directional coupler and at least a portion of the coupled optical signal may be coupled between the waveguides in the second directional coupler. Optical signals may be communicated out of the system with magnitudes at a desired percentage of the input optical signal. The length extender may add phase delay for signals in one of the first and second waveguides.

20 Claims, 14 Drawing Sheets

(56) References Cited

U.S. PATENT DOCUMENTS

| | | | | |
|---|---|---|---|---|
| 7,027,686 | B1* | 4/2006 | Wang | G02B 6/2821 |
| | | | | 385/24 |
| 8,238,014 | B2* | 8/2012 | Kucharski | G02F 1/0121 |
| | | | | 359/238 |
| 2006/0072866 | A1* | 4/2006 | Mizuno | G02B 6/266 |
| | | | | 385/1 |
| 2007/0047964 | A1* | 3/2007 | Ooi | H04B 10/66 |
| | | | | 398/147 |
| 2009/0097101 | A1* | 4/2009 | Hasegawa | G02F 2/00 |
| | | | | 359/325 |
| 2012/0063716 | A1* | 3/2012 | Mizuno | G02B 6/12007 |
| | | | | 385/11 |
| 2013/0209112 | A1* | 8/2013 | Witzens | G02B 6/423 |
| | | | | 398/214 |
| 2014/0293393 | A1* | 10/2014 | Fondeur | G02F 1/21 |
| | | | | 359/288 |

* cited by examiner

METHOD AND SYSTEM FOR STABILIZED DIRECTIONAL COUPLERS

CROSS-REFERENCE TO RELATED APPLICATIONS/INCORPORATION BY REFERENCE

This application is a continuation of U.S. application Ser. No. 14/105,328 filed on Dec. 13, 2013, now U.S. Pat. No. 10,338,309, which claims priority to U.S. Provisional Application 61/797,692, filed on Dec. 13, 2012, which is hereby incorporated herein by reference in its entirety.

FIELD

Certain embodiments of the invention relate to semiconductor processing. More specifically, certain embodiments of the invention relate to a method and system for stabilized directional couplers.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present invention as set forth in the remainder of the present application with reference to the drawings.

BRIEF SUMMARY

A system and/or method for stabilized directional couplers, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for stabilized directional couplers. Exemplary aspects of the invention may comprise a system comprising first and second directional couplers formed by first and second waveguides, where one of the first and second waveguides may comprise a length extender between the first and second directional couplers. The first and second directional couplers may be formed by reduced spacing between the first and second waveguides on opposite sides of the length extender. An input optical signal may be communicated into one of the first and second waveguides, where at least a portion of the input optical signal may be coupled between the first and second waveguides in the first directional coupler and at least a portion of the coupled optical signal may be coupled between the first and second waveguides in the second directional coupler. Optical signals may be communicated out of the system, where magnitudes of the optical signals communicated out of the system may be at a desired percentage of the input optical signal. The length extender may add phase delay for signals in one of the first and second waveguides. The desired percentage may be based on the reduced spacing and a size of the length extender. The system may comprise a 2×2 or a 1×3 splitter. The system may comprise a 1/N splitter, where 1/N represents the signal strength in each output of the 1/N splitter. A magnitude of the input optical signal may be monitored utilizing a photodiode in a loop formed by one of the first or second waveguides. The optical signals communicated out of the system may be modulated before communicated to a second stabilized directional coupler formed by the first and second waveguides and comprising a second length extender. The optical signals may be modulated utilizing phase modulators in each of the first and second waveguides. The system may be integrated in a Complementary Metal-Oxide Semiconductor (CMOS) chip.

Figure 1A:
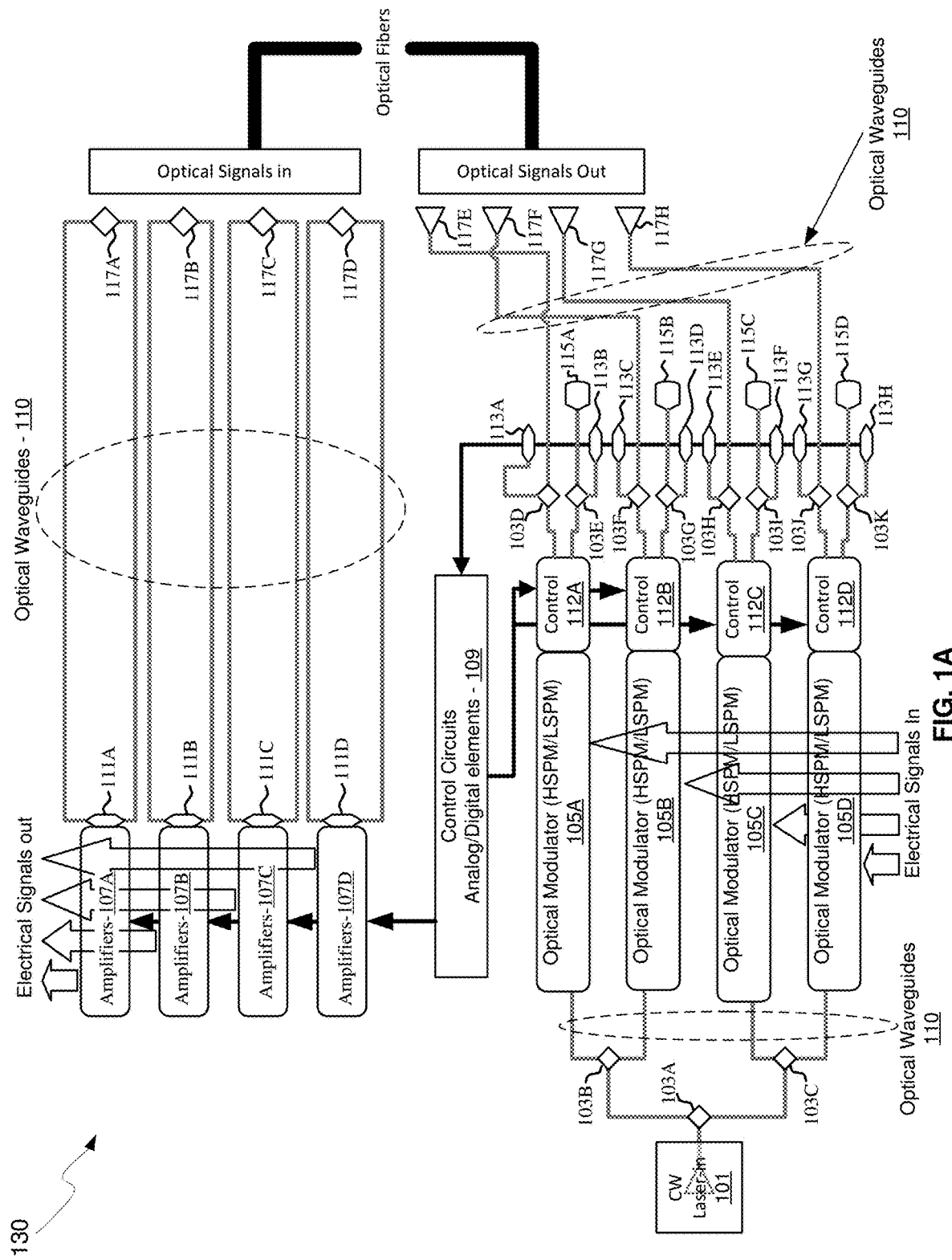
FIG. 1A is a block diagram of a photonically enabled CMOS chip comprising grating couplers with perturbed waveguides, in accordance with an example embodiment of the disclosure.

FIG. 1A is a block diagram of a photonically enabled CMOS chip comprising grating couplers with perturbed waveguides, in accordance with an exemplary embodiment of the invention. Referring to FIG. 1A, there is shown optoelectronic devices on a CMOS chip 130 comprising optical modulators 105A-105D, photodiodes 111A-111D, monitor photodiodes 113A-113H, and optical devices comprising directional couplers 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

Optical signals are communicated between optical and optoelectronic devices via optical waveguides 110 fabricated in the CMOS chip 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab.

The optical modulators 105A-105D comprise Mach-Zehnder or ring modulators, for example, and enable the modulation of the continuous-wave (CW) laser input signal. The optical modulators 105A-105D comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

The phase modulators may have a dual role: to compensate for the passive biasing of the MZI and to apply the additional phase modulation used to modulate the light intensity at the output port of the MZI according to a data stream. The former phase tuning and the latter phase modulation may be applied by separate, specialized devices, since the former is a low speed, slowly varying contribution, while the latter is typically a high speed signal. These devices are then respectively referred to as the LSPM and the HSPM. Examples for LSPM are thermal phase modulators (TPM), where a waveguide portion is locally heated up to modify the index of refraction of its constituting materials, or forward biased PIN junction phase modulators (PINPM) where current injection into the PIN junction modifies the carrier density, and thus the index of refraction of the semiconductor material. An example of an HSPM is a reversed biased PIN junction, where the index of refraction is also modulated via the carrier density, but which allows much faster operation, albeit at a lower phase modulation efficiency per waveguide length.

The outputs of the modulators 105A-105D may be optically coupled via the waveguides 110 to the grating couplers 117E-117H. The directional couplers 103A-103K may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103K may be terminated by optical terminations 115A-115D to avoid back reflections of unwanted signals.

The directional coupler is one of the main building blocks in silicon photonic circuits, and consists of two waveguides that are curved to come in close proximity at a point so that light may couple evanescently between the waveguides. Several types of directional couplers exist. For example, a 3 dB directional coupler splitter is a DC with two input and two output ports that can split the input light equally into the two outputs, as illustrated by the directional couplers 103A-103C, for example. It may be used in a splitter tree to create parallel channels and in an MZI modulator, such as the modulators 105A-105D. Directional coupler taps may be used in a control system. These devices may tap off a predefined portion of the light from the main waveguide into a tap waveguide that goes to a monitor photodiode, as illustrated by the directional couplers 103D-103K.

The performance of a directional coupler may be very sensitive to deviations in device dimensions, such as waveguide width/thickness and etch depth. Consequently, the coupling ratio, i.e. the fraction of light coupled over to the other waveguide, may differ significantly from directional coupler to directional coupler due to process variations. This is undesirable, because it introduces imbalance between the channels in a splitter tree, which results in a power penalty, and may also add uncertainty and potentially a power penalty for monitoring taps.

In an example scenario, the directional couplers 103A-103K may comprise stabilized directional couplers, or stabilized splitters, where a splitter comprises two directional couplers in series. While the coupling ratio of the same directional coupler design may differ significantly from wafer to wafer and within one wafer, closely spaced directional couplers on one wafer may have strongly correlated performance. This correlation enables the design of stabilized taps and splitters.

In an example scenario, the length of one waveguide, or arm, of the waveguides between two directional couplers may be longer than the other by incorporating a curved length extender, similar to a chicane in a racetrack, which may stabilize or reduce variation of light output levels between the outputs of directional couplers. The difference in waveguide length needed to achieve stabilization may depend on the specific correlation between the directional couplers and the tap ratio and may be determined through Monte Carlo simulations. This is shown further with respect to FIGS. 2-8.

The grating couplers 117A-117H comprise optical gratings that enable coupling of light into and out of the CMOS chip 130. The grating couplers 117A-117D may be utilized to couple light received from optical fibers into the CMOS chip 130, and the grating couplers 117E-117H may be utilized to couple light from the CMOS chip 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the CMOS chip 130 to optimize coupling efficiency. In an example embodiment, the optical fibers may comprise single-mode fiber (SMF) and/or polarization-maintaining fiber (PMF).

In another exemplary embodiment, optical signals may be communicated directly into the surface of the CMOS chip 130 without optical fibers by directing a light source on an optical coupling device in the chip, such as the light source interface 135 and/or the optical fiber interface 139. This may be accomplished with directed laser sources and/or optical sources on another chip flip-chip bonded to the CMOS chip 130.

The photodiodes 111A-111D may convert optical signals received from the grating couplers 117A-117D into electrical signals that are communicated to the amplifiers 107A-107D for processing. In another embodiment of the invention, the photodiodes 111A-111D may comprise high-speed heterojunction phototransistors, for example, and may comprise germanium (Ge) in the collector and base regions for absorption in the 1.3-1.6 µm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the CMOS chip 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the CMOS chip 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the CMOS chip 130.

Integrated photonics platforms allow the full functionality of an optical transceiver to be integrated on a single chip, the CMOS chip 130, for example. A transceiver chip comprises optoelectronic circuits that create and process the optical/electrical signals on the transmitter (Tx) and the receiver (Rx) sides, as well as optical interfaces that couple the optical signal to and from one or more fibers. The signal processing functionality may comprise modulating the optical carrier, detecting the optical signal, splitting or combining data streams, and multiplexing or demultiplexing data on carriers with different wavelengths. In another example scenario, a plurality of chips may be utilized, with an optical interposer for receiving electronics chips and photonics chips, in instances where the electronics chips and photonics chips are manufactured in different CMOS nodes.

The light source may be external to the chip or may be integrated with the chip in a hybrid scheme. It is often advantageous to have an external continuous-wave (CW) light source, because this architecture allows heat sinking and temperature control of the source separately from the transceiver chip 130. An external light source may also be connected to the transceiver chip 130 via a fiber interface.

An integrated transceiver may comprise at least three optical interfaces, including a transmitter input port to interface to the CW light source, labeled as CW Laser In 101; a transmitter output port to interface to the fiber carrying the optical signal, labeled Optical Signals Out; and a receiver input port to interface to the fiber carrying the optical signal, labeled Optical Signals In.

Figure 1B:
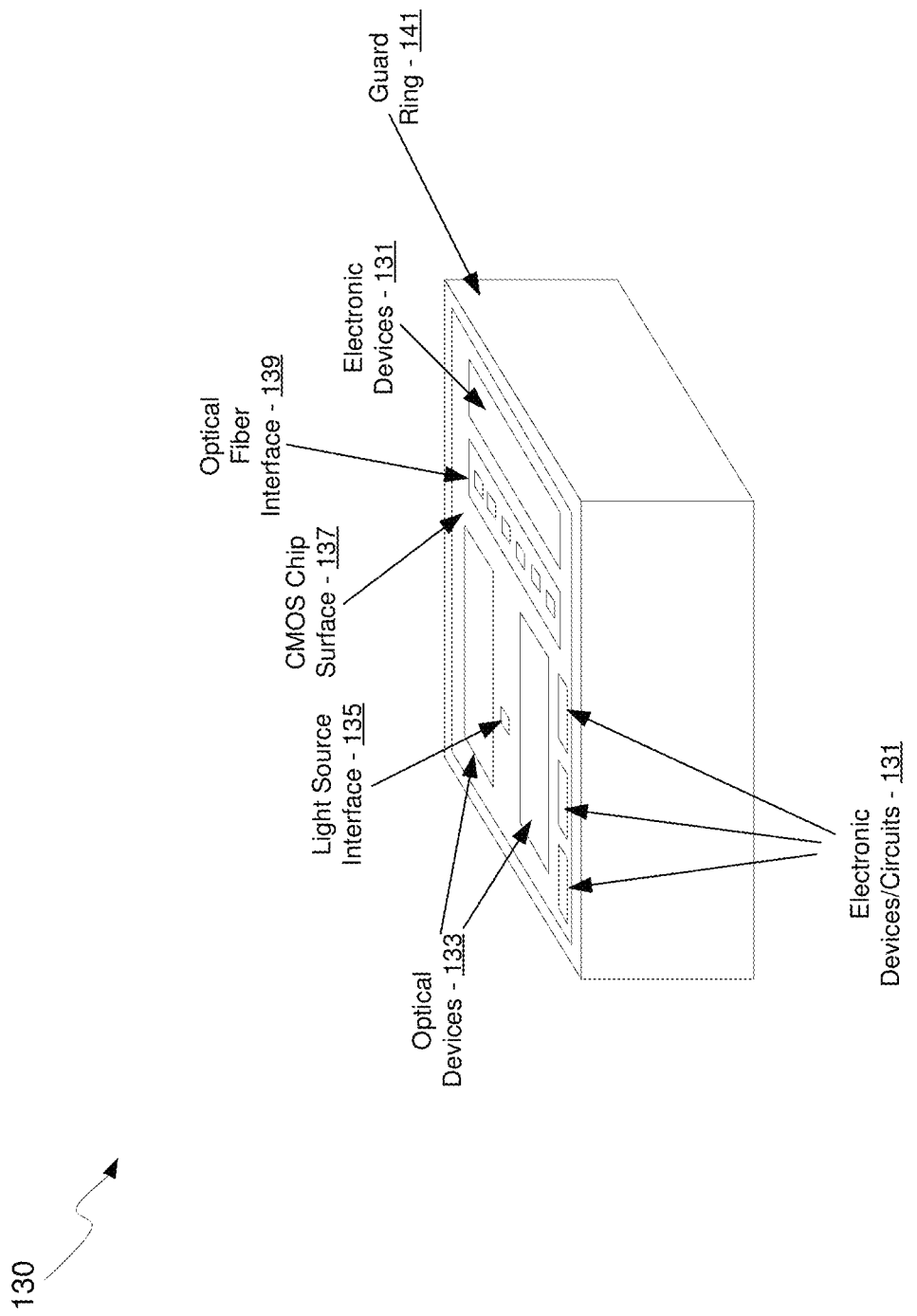
FIG. 1B is a diagram illustrating a CMOS chip, in accordance with an example embodiment of the disclosure.

FIG. 1B is a diagram illustrating an exemplary CMOS chip, in accordance with an exemplary embodiment of the invention. Referring to FIG. 1B, there is shown the CMOS chip 130 comprising electronic devices/circuits 131, optical and optoelectronic devices 133, a light source interface 135, CMOS chip front surface 137, an optical fiber interface 139, and CMOS guard ring 141.

The light source interface 135 and the optical fiber interface 139 comprise grating couplers, for example, that enable coupling of light signals via the CMOS chip surface 137, as opposed to the edges of the chip as with conventional edge-emitting devices. Coupling light signals via the CMOS chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the directional couplers 103A-103K, optical terminations 115A-115D, grating couplers 117A-117H, optical modulators 105A-105D, high-speed heterojunction photodiodes 111A-111D, and monitor photodiodes 113A-113H.

In an example scenario, the directional couplers 103A-103K may comprise stabilized directional couplers. While the coupling ratio of the same directional coupler design may differ significantly from wafer to wafer and within one wafer, closely spaced directional couplers on one wafer may have strongly correlated performance. This correlation enables the design of stabilized taps and splitters.

Figure 1C:
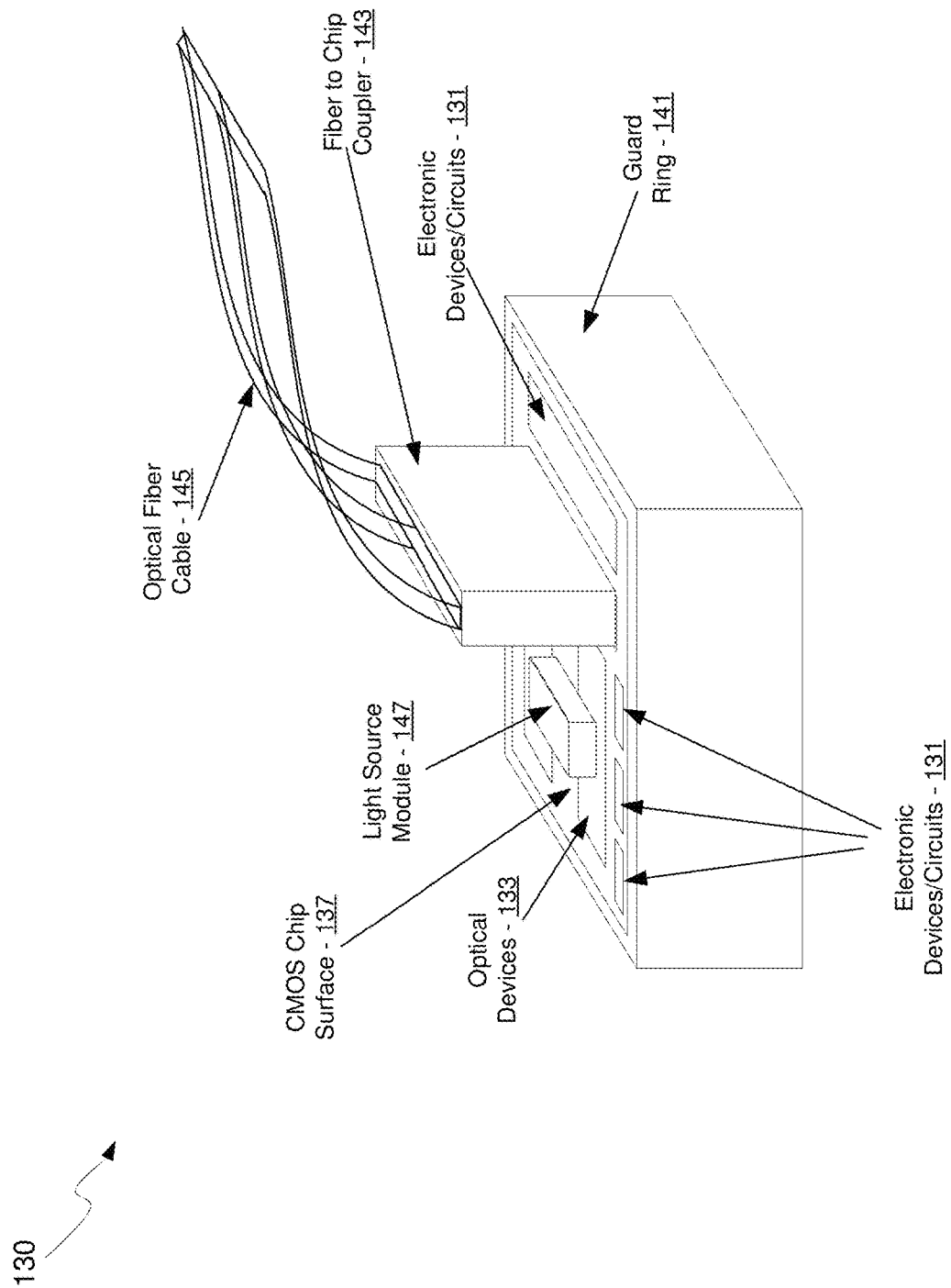
FIG. 1C is a diagram illustrating a CMOS chip coupled to an optical fiber cable, in accordance with an example embodiment of the disclosure.

FIG. 1C is a diagram illustrating a CMOS chip coupled to an optical fiber cable, in accordance with an exemplary embodiment of the invention. Referring to FIG. 1C, there is shown the CMOS chip 130 comprising the CMOS chip surface 137, and the CMOS guard ring 141. There is also shown a fiber-to-chip coupler 143, an optical fiber cable 145, and an optical source assembly 147.

The CMOS chip 130 comprising the electronic devices/circuits 131, the optical and optoelectronic devices 133, the light source interface 135, the CMOS chip surface 137, and the CMOS guard ring 141 may be as described with respect to FIG. 1B.

In an example embodiment, the optical fiber cable may be affixed, via epoxy for example, to the CMOS chip surface 137. The fiber chip coupler 143 enables the physical coupling of the optical fiber cable 145 to the CMOS chip 130.

In an example scenario, the directional couplers 103A-103K may comprise stabilized directional couplers. While the coupling ratio of the same directional coupler design may differ significantly from wafer to wafer and within one wafer, closely spaced directional couplers on one wafer may have strongly correlated performance. This correlation enables the design of stabilized taps and splitters.

Figure 2:
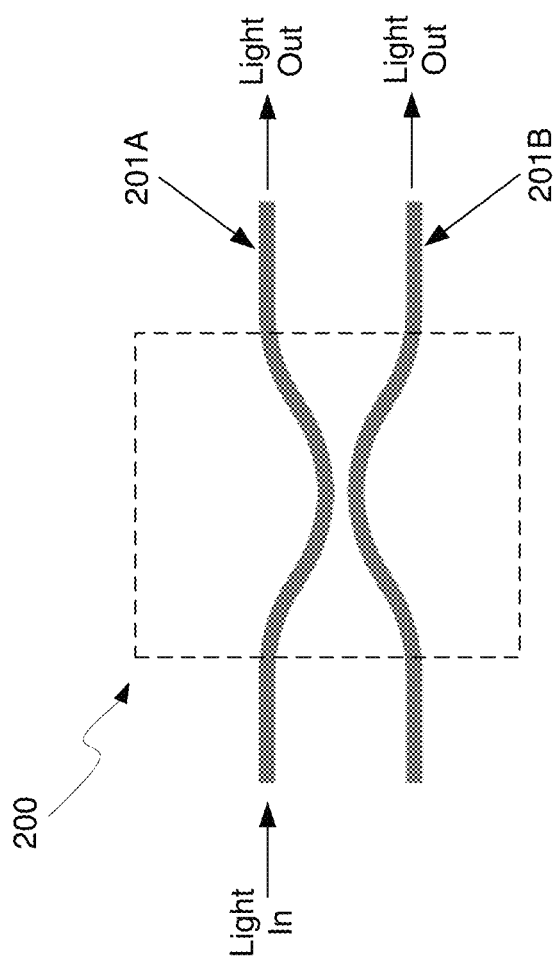
FIG. 2 is a schematic illustrating a directional coupler, in accordance with an example embodiment of the disclosure.

FIG. 2 is a schematic illustrating a directional coupler, in accordance with an example embodiment of the disclosure. Referring to FIG. 2, there is shown directional coupler 200 comprising waveguides 201A and 201B. The waveguides 201A and 201B may comprise silicon, for example, that has been etched into ridge structures. The waveguides 201A and 201B may comprise a dielectric cladding layer or air cladding, for example.

In operation, light may be coupled into one waveguide, as indicated by the arrow pointing in to the waveguide 201A. Due to the bends in the waveguides 201A and 201B, bringing them close together, light may be evanescently coupled into the waveguide 201B. The amount of light coupled to the waveguide 201B may be configured by the distance between the waveguides in the directional coupler 200. It should be noted that light may be coupled into and out of any end of the waveguides, and the directional coupler 200 may be bi-directional in that light can travel in both directions.

The performance of the directional coupler 200 may be very sensitive to deviations in device dimensions, such as waveguide 201A and 201B width/thickness and etch depth. Consequently, the coupling ratio, i.e. the fraction of light coupled over to the other waveguide, may differ significantly from directional coupler to directional coupler due to process variations. This is undesirable, because it introduces imbalance between the channels in a splitter tree, which results in a power penalty, and may also add uncertainty and potentially a power penalty for monitoring taps. This imbalance may be mitigated and/or eliminated by utilizing a stabilized directional coupler as illustrated in FIGS. 3-8.

Figure 3A:
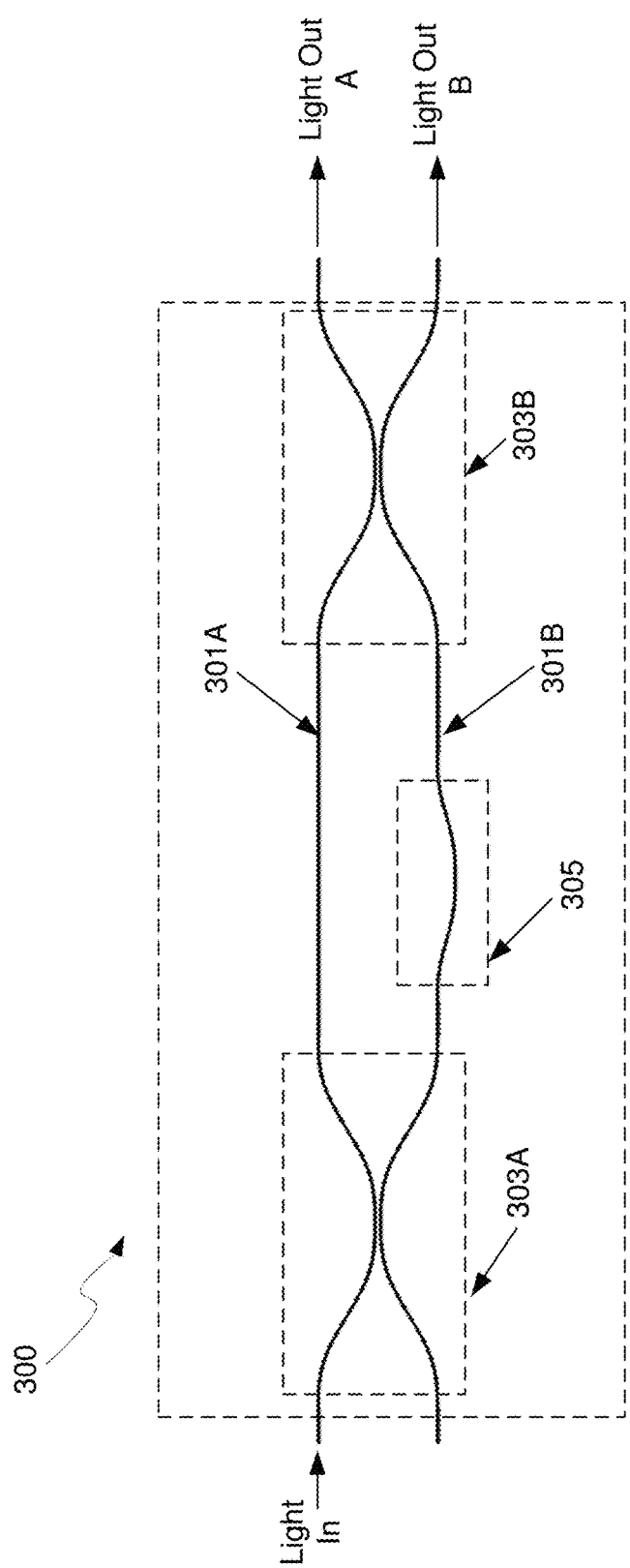
FIG. 3A is a schematic illustrating a stabilized directional coupler, in accordance with an example embodiment of the disclosure.

FIG. 3A is a schematic illustrating a stabilized directional coupler, in accordance with an example embodiment of the disclosure. Referring to FIG. 3A, there is shown stabilized directional coupler 300 comprising waveguides 301A and 301B that come in close proximity in two locations, thus forming the directional couplers 303A and 303B. In addition, the waveguide 301B may comprise a length extender 305, which may comprise a curved region added to the design of the waveguide 301B to provide a longer optical path. Therefore, the stabilized directional coupler 300 comprises a 2×2 splitter formed by the combination of the two directional couplers 303A and 303B with the length extender 305.

In an example scenario, a stabilized X % directional coupler may be configured by cascading two directional couplers, the first one, directional coupler 303A with a targeted 100% coupling, and the second one, directional coupler 303B, with a targeted 100-X % coupling, where the length extender 305 provides a difference in length/phase delay in the connecting waveguides 301A and 301B. The 3 dB splitter is a special case of the X % tap, where X=50%.

The difference in waveguide length provided by the length extender 305 in one of the waveguides to achieve stabilization depends on the specific correlation between the directional couplers 303A and 303B and the tap ratio, and may be determined through Monte Carlo simulations. It should be noted that the position of the 100% and 100-X % directional coupler is interchangeable.

The simulation for determining the size of the length extender 305 may proceed as follows. In an example scenario, the waveguides 301A and 301B may be approximately 360 nm wide, and the coupling ratios of 100% and 100-X % may be targeted by adjusting the minimum gap between the waveguides 301A and 301B. For light coming in from one input waveguide we can write the input amplitudes as:

$$\text{input} = \begin{bmatrix} 1 \\ 0 \end{bmatrix}$$

The transfer matrices for the directional couplers may be written as:

$$T_{DC1} = \begin{bmatrix} \cos\varphi_1 & -i\sin\varphi_1 \\ -i\sin\varphi_1 & \cos\varphi_1 \end{bmatrix} \text{ and}$$

$$T_{DC2} = \begin{bmatrix} \cos\varphi_2 & -i\sin\varphi_2 \\ -i\sin\varphi_2 & \cos\varphi_2 \end{bmatrix}$$

with $(\sin \phi_1)^2 = CR_1$ and $(\sin \phi_2)^2 = CR_2$, where $CR_1$ and $CR_2$ are the coupling ratios of the two directional couplers. For example, for a 100% directional coupler, $$\phi_1 = \frac{\pi}{2};$$

for a 95% DC, $\Phi_1 \approx 1.345$.

The transfer matrix for the center section, or length extender, that introduces the phase difference δ from a difference in waveguide length may be represented by:

$$T_{\Delta L} = \begin{bmatrix} 1 & 0 \\ 0 & \exp(i\delta) \end{bmatrix}.$$

The output amplitudes may then then be calculated from:

output=$T_{DC2}T_{\Delta L}T_{DC1}$input

Values for $\phi_1$ may be randomly generated from a probability distribution that may be established based on experimental test data for single-stage directional couplers, and may be approximated as a normal distribution. For a certain value of $\phi_1$, $\phi_2$ may be set based on the correlation between the two variables. This correlation may also be established based on experimental test data for single-stage directional couplers. The expected distribution of coupling ratios may be calculated for different values of δ. The results of Monte Carlo simulations (assuming perfect correlation between the 100% and 95% DCs) for a 5% stabilized DC are shown in FIG. 3B.

Figure 3B:
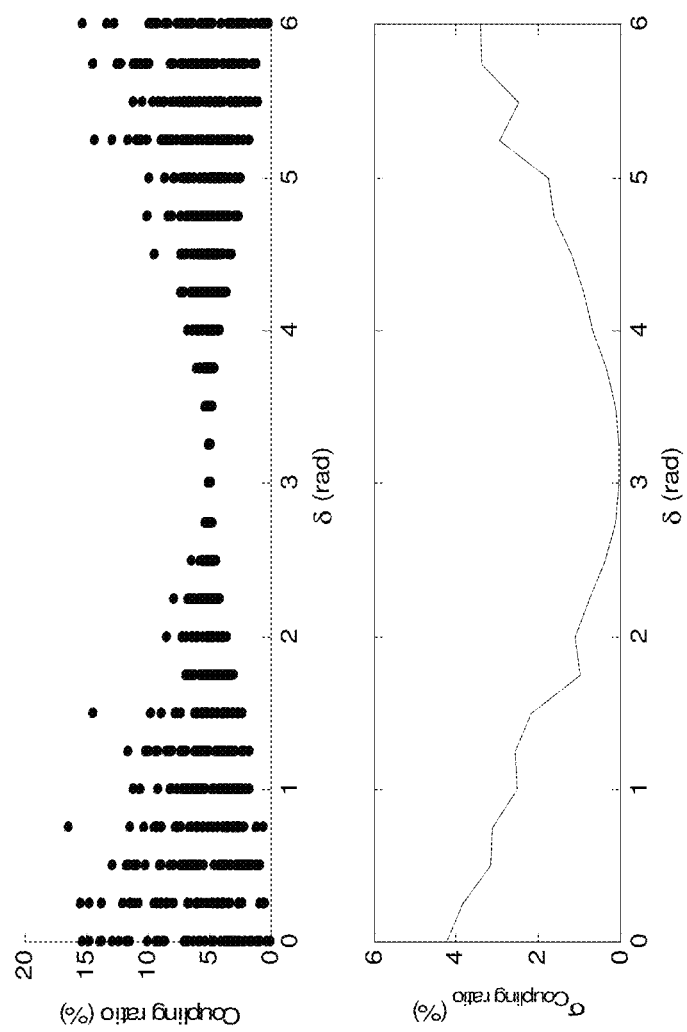
FIG. 3B illustrates Monte Carlo simulations for the design of a stabilized 5% directional coupler, in accordance with an example embodiment of the disclosure.

FIG. 3B illustrates Monte Carlo simulations for the design of a stabilized 5% directional coupler, in accordance with an example embodiment of the disclosure. Referring to FIG. 3B, the upper plot shows the coupling ratio between outputs of a stabilized directional coupler versus δ, which comprises the phase difference from a difference in waveguide length. It can be observed that the lowest variability occurs in a range near δ=3+2nπ radians, with n being an integer.

The lower plot illustrates the standard deviation, in percent, of the coupling ratios versus δ again showing the lowest variability occurring in a range near δ=3+2nπ radians, with n being an integer.

Figure 4A:
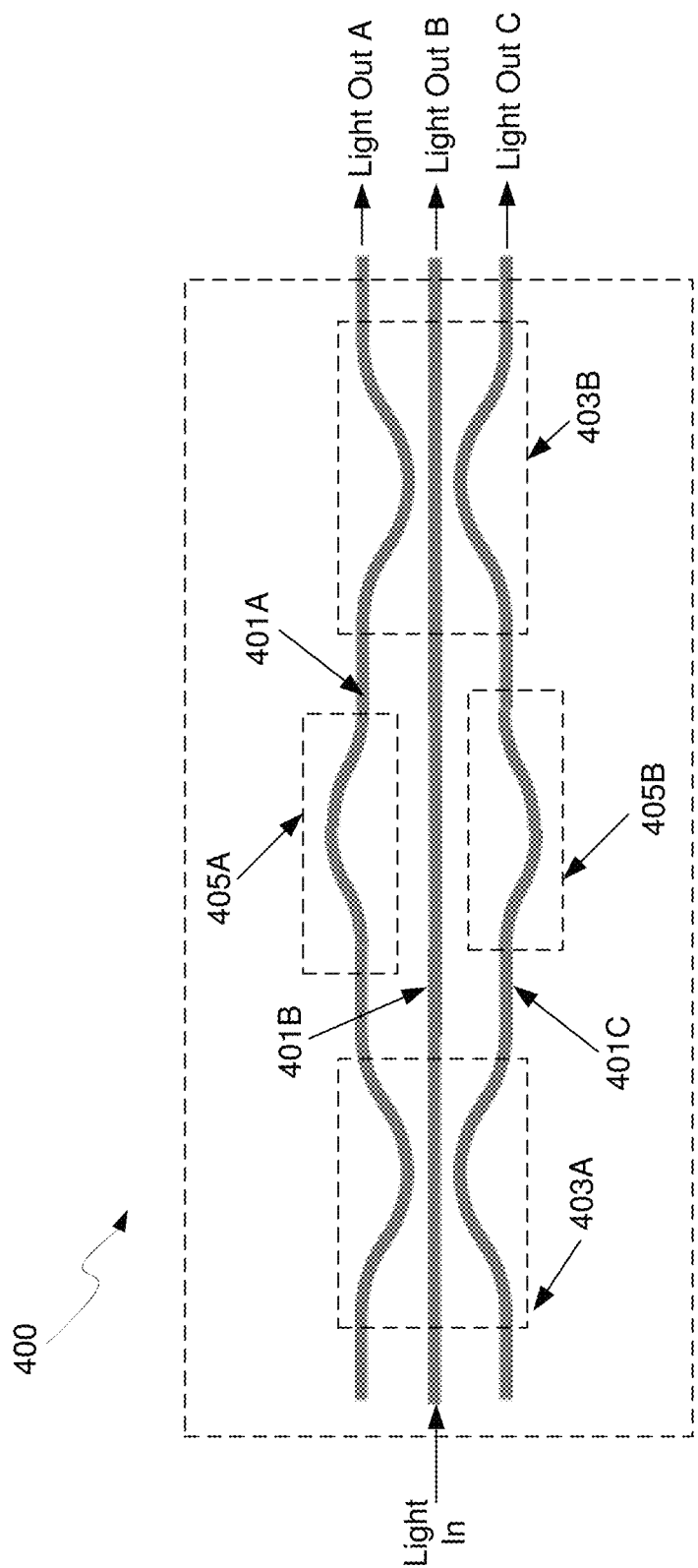
FIG. 4A is a drawing illustrating a 1×3 stabilized directional coupler, in accordance with an example embodiment of the disclosure.

FIG. 4A is a drawing illustrating a 1×3 stabilized directional coupler, in accordance with an example embodiment of the disclosure. Referring to FIG. 4A there is shown 1×3 stabilized directional coupler 400 comprising waveguides 401A-401C and length extenders 405A and 405B. Therefore, the 1×3 stabilized directional coupler 400 comprises a 1×3 splitter formed by the cascaded 1×3 directional couplers 403A and 403B that may be formed by the reduced spacing between the waveguides 401A-401C.

A stabilized 1×3 coupler, or 1×3 splitter, may be formed by cascading two 1×3 directional couplers and introducing a difference in waveguide length between center and outer waveguides, as illustrated by the length extenders 405A and 405B. In an example scenario, the first directional coupler 403A may be targeted at coupling all light from the center to the outer waveguides 401A and 401C and the second directional coupler 403B may be targeted at coupling ⅓ of the input light back to the center waveguide 403B. In this manner, the output signals, Light Out A-C may each comprise ⅓ of the input signal, namely Light In shown in FIG. 4A.

Figure 4B:
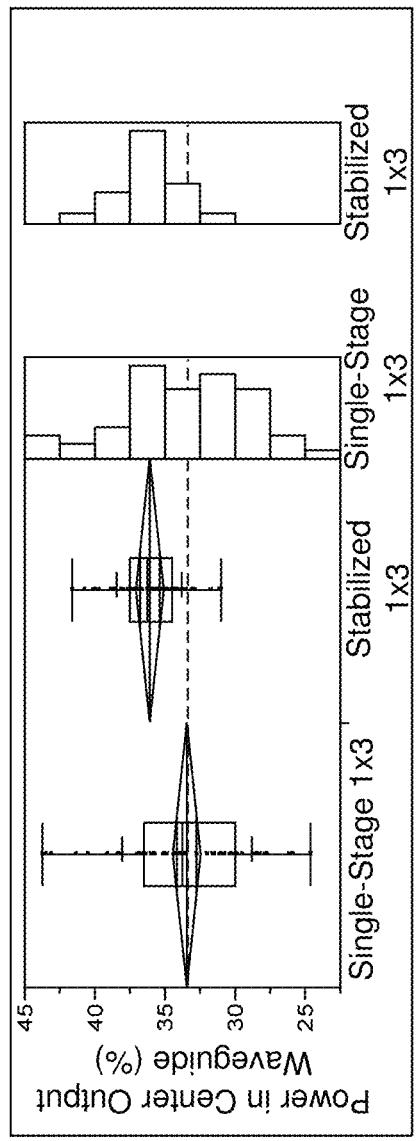
FIG. 4B illustrates experimental results for output power variation for 1×3 splitters across a wafer, in accordance with an example embodiment of the disclosure

FIG. 4B illustrates experimental results for output power variation for 1×3 splitters across a wafer, in accordance with an example embodiment of the disclosure. Referring to FIG. 4B, there is shown a plot of experimental data for a single stage 1×3 directional coupler, i.e., without length extenders, and a stabilized directional coupler.

The left plot shows the average output powers in the center output waveguide for single-stage and stabilized directional couplers across a wafer. The box plots show that the stabilized 1×3 directional couplers show significantly less variation across the wafer than the single stage 1×3 splitter.

Similarly, the right plot shows the distribution of average power output across the wafer, with significantly more variation for the single-stage 1×3 splitter versus the stabilized directional coupler shown by the data on the right-most plot in FIG. 4B.

Figure 5:
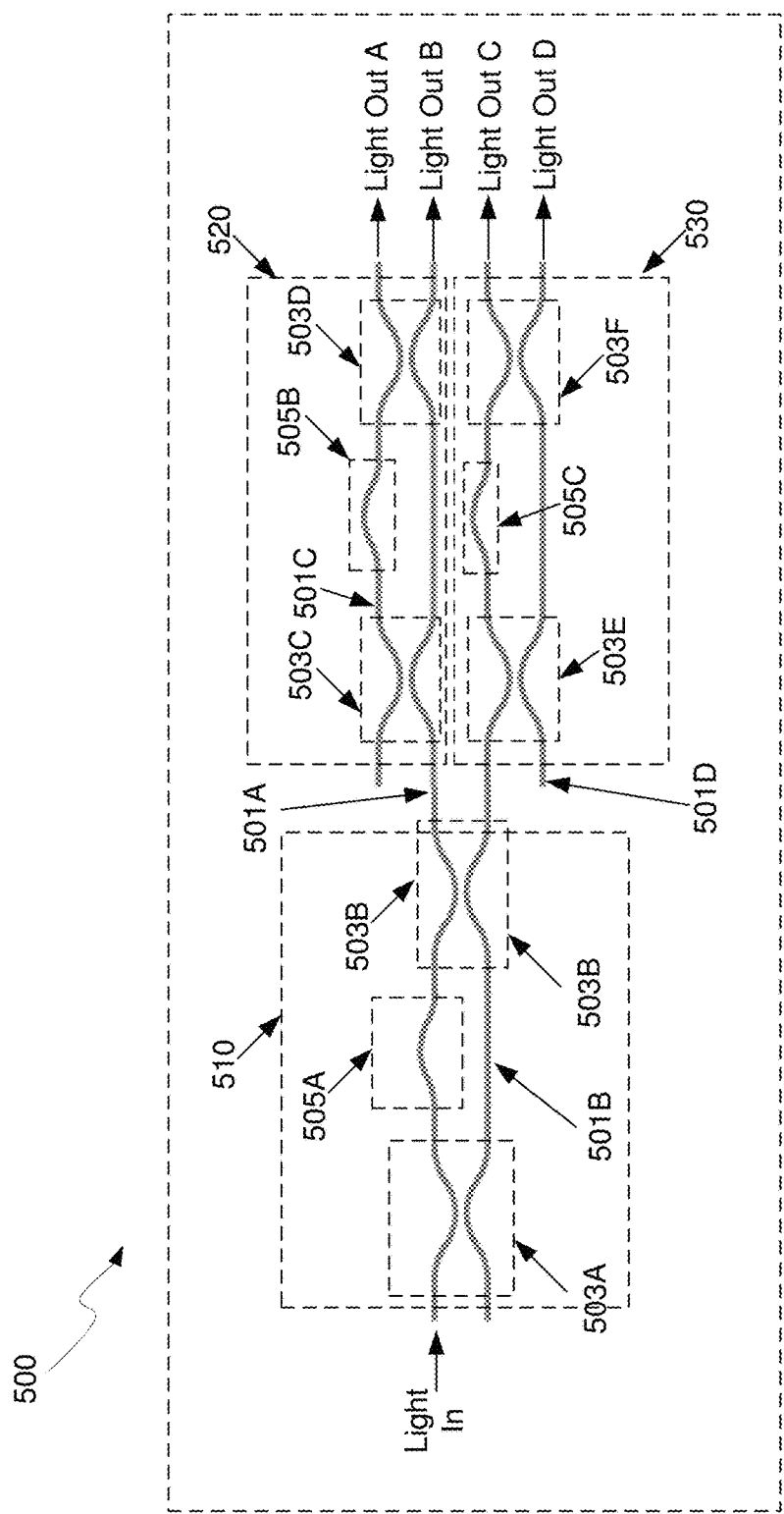
FIG. 5 is a drawing illustrating a stabilized 2×4 splitter tree, in accordance with an example embodiment of the disclosure.

FIG. 5 is a drawing illustrating a stabilized 2×4 splitter tree, in accordance with an example embodiment of the disclosure. Referring to FIG. 5, there is shown 2×4 splitter tree 500 comprising waveguides 501A-501D and length extenders 505A-505C, which may be utilized to form stabilized 2×2 directional couplers 510, 520, and 530. Each of the stabilized 2×2 directional couplers 510, 520, and 530 may comprise a pair of directional couplers, e.g., directional coupler pairs 503A/503B, 503C/503D, and 503E/503F, and length extenders 505A-505C, respectively. Accordingly, the serial/parallel connection of the stabilized 2×2 directional couplers 510, 520, and 530 may result in equal output powers for Light Out A-D when each of the 2×2 directional couplers 510, 520, and 530 comprise 50% (3 dB) directional couplers.

In an example scenario, any number of output directional couplers may be formed by combining 2×2 and 1×3 stabilized directional couplers, limited by useful output power and available chip area, for example. For example, 1/N splitters, or splitter trees, may be formed with N being an integer and 1/N representing the signal intensity at each of the outputs of the splitter.

Figure 6:
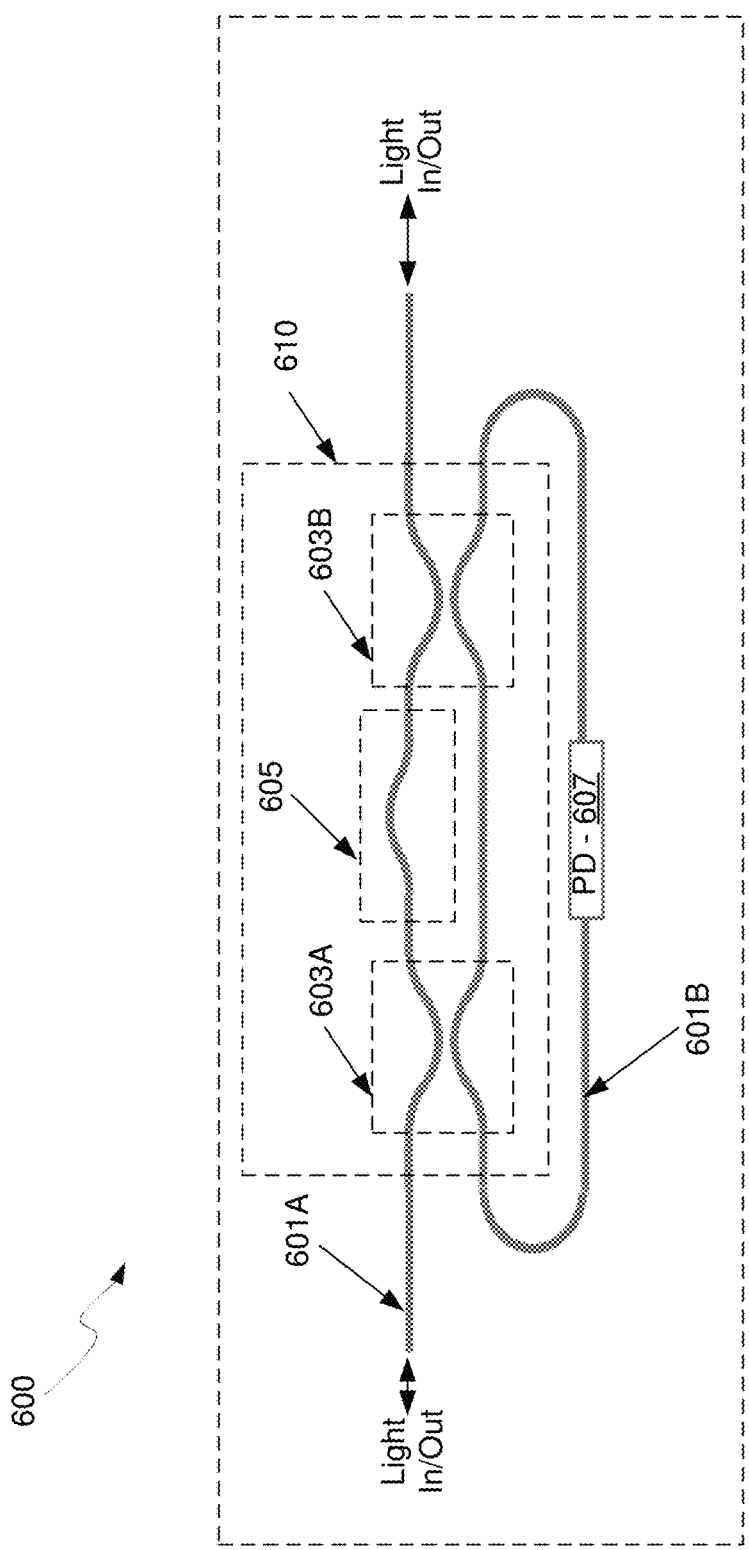
FIG. 6 is a drawing illustrating a stabilized monitoring tap, in accordance with an example embodiment of the disclosure.

FIG. 6 is a drawing illustrating a stabilized monitoring tap, in accordance with an example embodiment of the disclosure. Referring to FIG. 6, there is shown stabilized monitoring tap 600 comprising a stabilized directional coupler 610 and a photodiode 607. The stabilized directional coupler 610 may comprise a 2×2 stabilized directional coupler with waveguides 601A and 601B, directional couplers 603A and 603B, and a length extender 605.

The photodiode 607 may comprise a waveguide photodiode that is connected as shown in FIG. 6 such that it may allow monitoring light coming from both directions, as illustrated by Light In/Out at both ends of the waveguide 601A.

In an another example scenario, a grating coupler may be integrated in place of the photodiode 607 on the chip comprising the stabilized monitoring tap 600 so that light may be detected off-chip.

Figure 7:
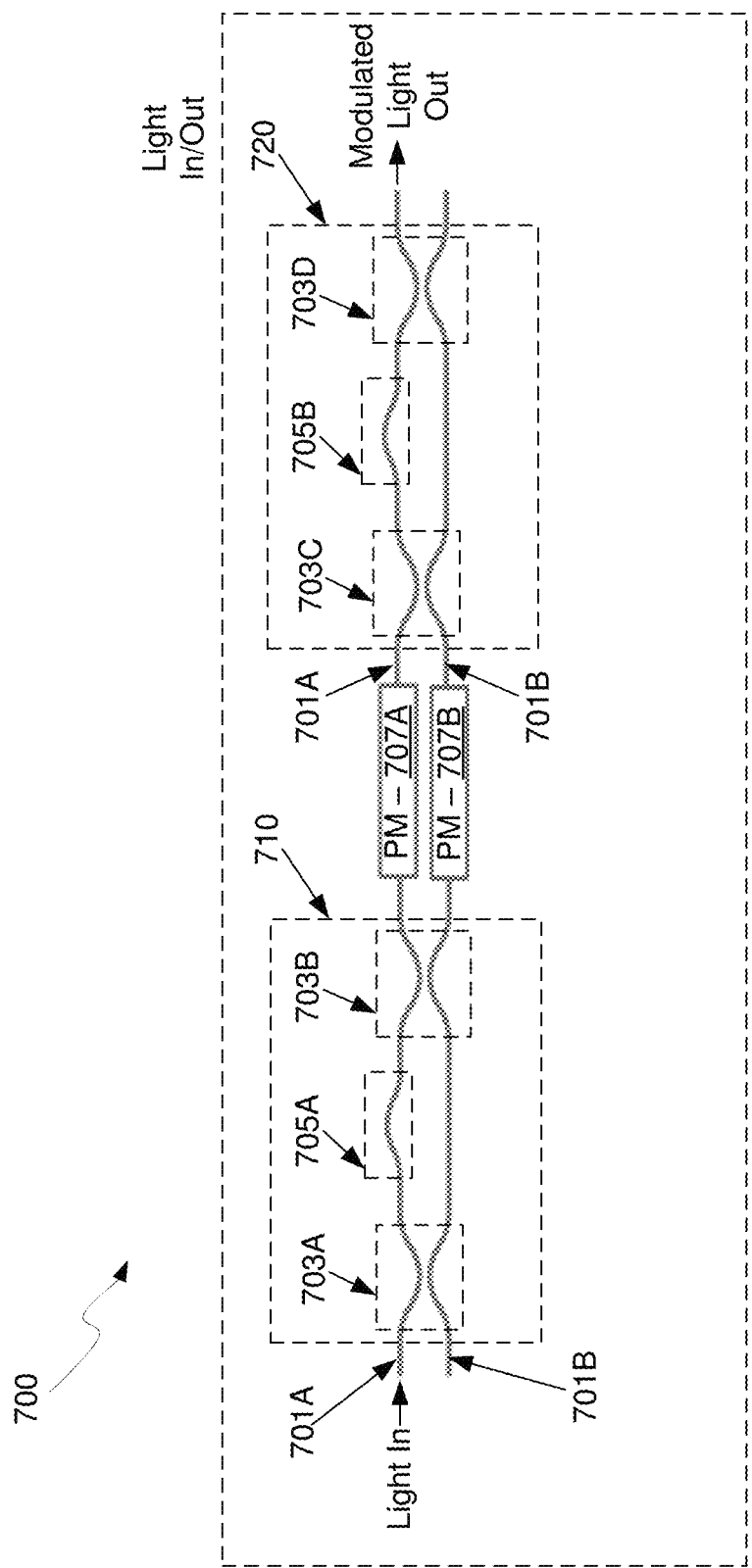
FIG. 7 is a drawing illustrating a Mach-Zehnder interferometer with stabilized directional couplers, in accordance with an example embodiment of the disclosure.

FIG. 7 is a drawing illustrating a Mach-Zehnder interferometer with stabilized directional couplers, in accordance with an example embodiment of the disclosure. Referring to FIG. 7, there is shown a stabilized Mach Zehnder Interferometer (MZI) 700 comprising waveguides 701A and 701B, 2×2 stabilized directional couplers 710 and 720, and phase modulators 707A and 707B.

The 2×2 stabilized directional couplers 710 and 720 may comprise directional couplers 703A/703B and 703C/703D, and length extenders 705A and 705B, respectively. In instances where the 2×2 stabilized directional couplers 710 and 720 comprise stabilized 3 dB splitters, the stabilized couplers may be used to improve the performance of an MZI modulator as shown in FIG. 6, by reducing the optical modulation amplitude (OMA) penalty, as compared to a single directional coupler.

FIGS. 8A-8F illustrate the performance of stabilized directional couplers with optical test data collected on several wafers from multiple lots, in accordance with an example embodiment of the disclosure. For all cases, the stabilized directional couplers show a significant reduction in variability compared to single-stage designs. The remaining variability in the stabilized directional coupler results is in part due to test gauge and imperfect correlation between the directional couplers.

Figures 8A, 8B:
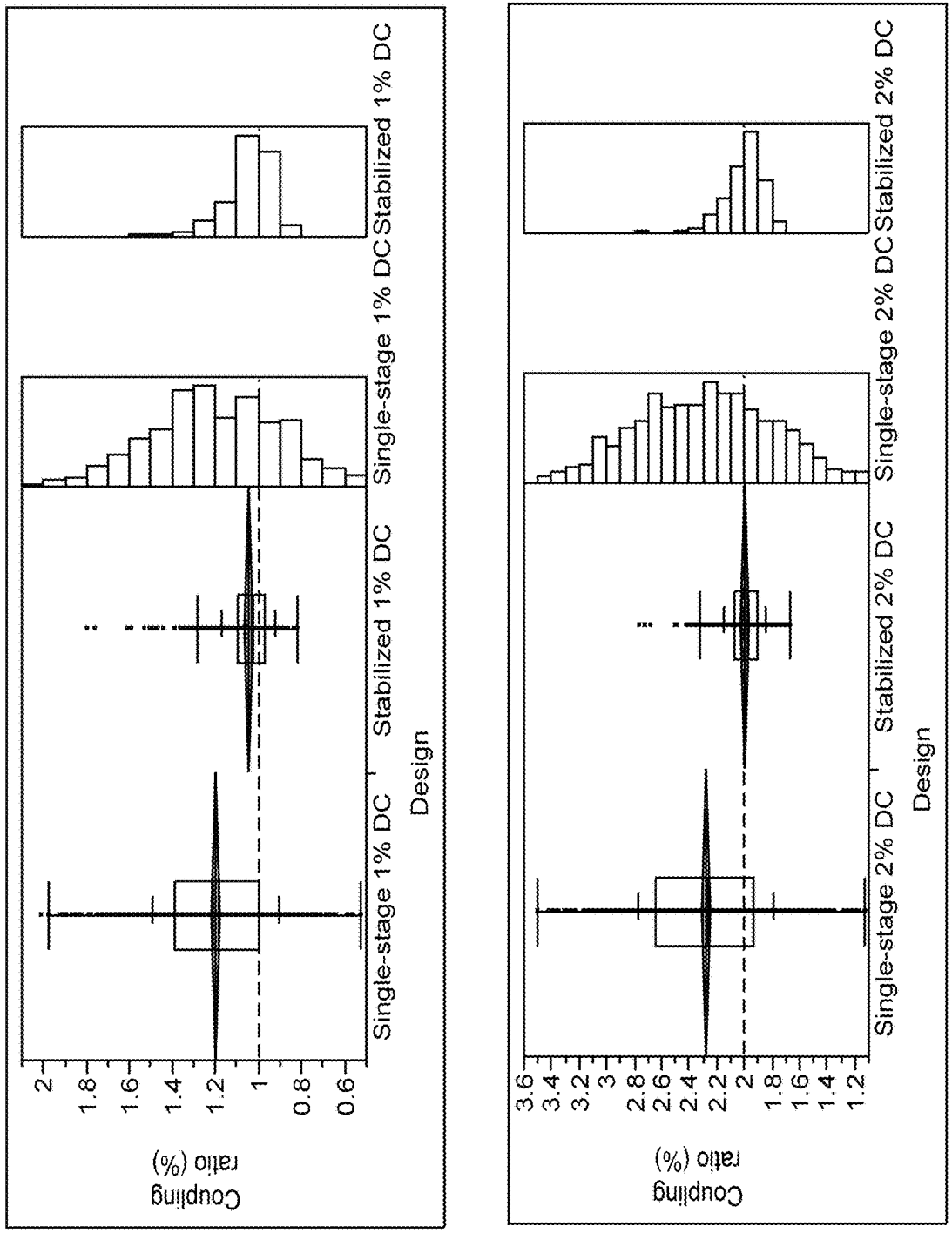
FIGS. 8A-8F illustrate the performance of stabilized directional couplers with optical test data collected on several wafers from multiple lots, in accordance with an example embodiment of the disclosure.

FIGS. 8A and 8B show experimental results for 1% and 2% designs, comparing results between single stage and stabilized directional couplers, where the stabilized structures show coupling ratio percentages of near 1% and 2%, respectively, compared to the single stage directional couplers that result in 1.2% and 2.3%, respectively, and with significantly higher variability across the wafer for the single stage directional couplers, as shown by the distribution plots to the right.

Figures 8C, 8D:
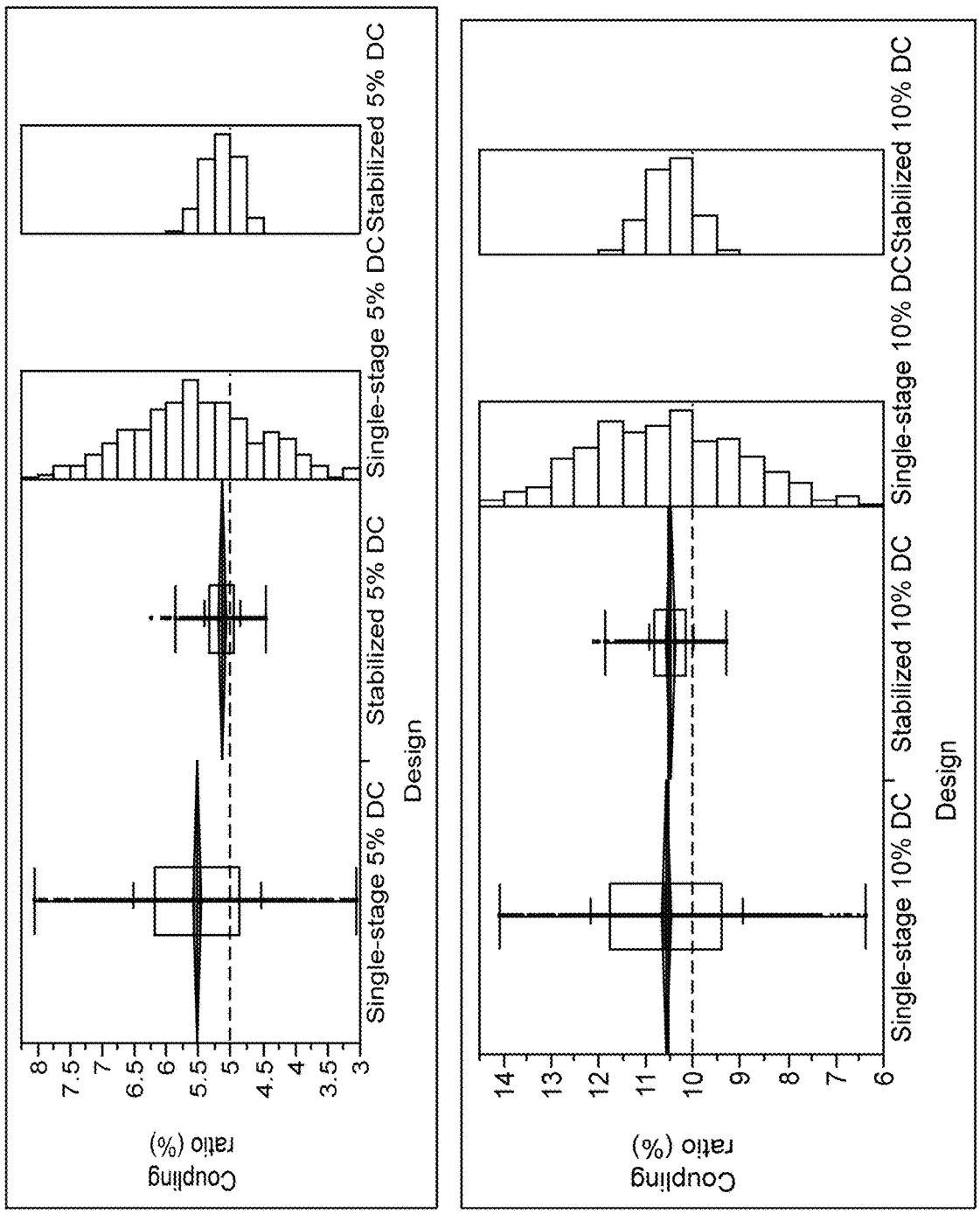

Similarly, FIGS. 8C and 8D show experimental results for 5% and 10% designs, comparing results between single stage and stabilized directional couplers, where the stabilized structures show coupling ratio percentages of 5.1% and 10.4%, respectively, compared to the single stage directional couplers that result in 5.5% and 10.5%, respectively, and with significantly higher variability across the wafer for the single stage directional couplers, as shown by the distribution plots to the right.

Figures 8E, 8F:
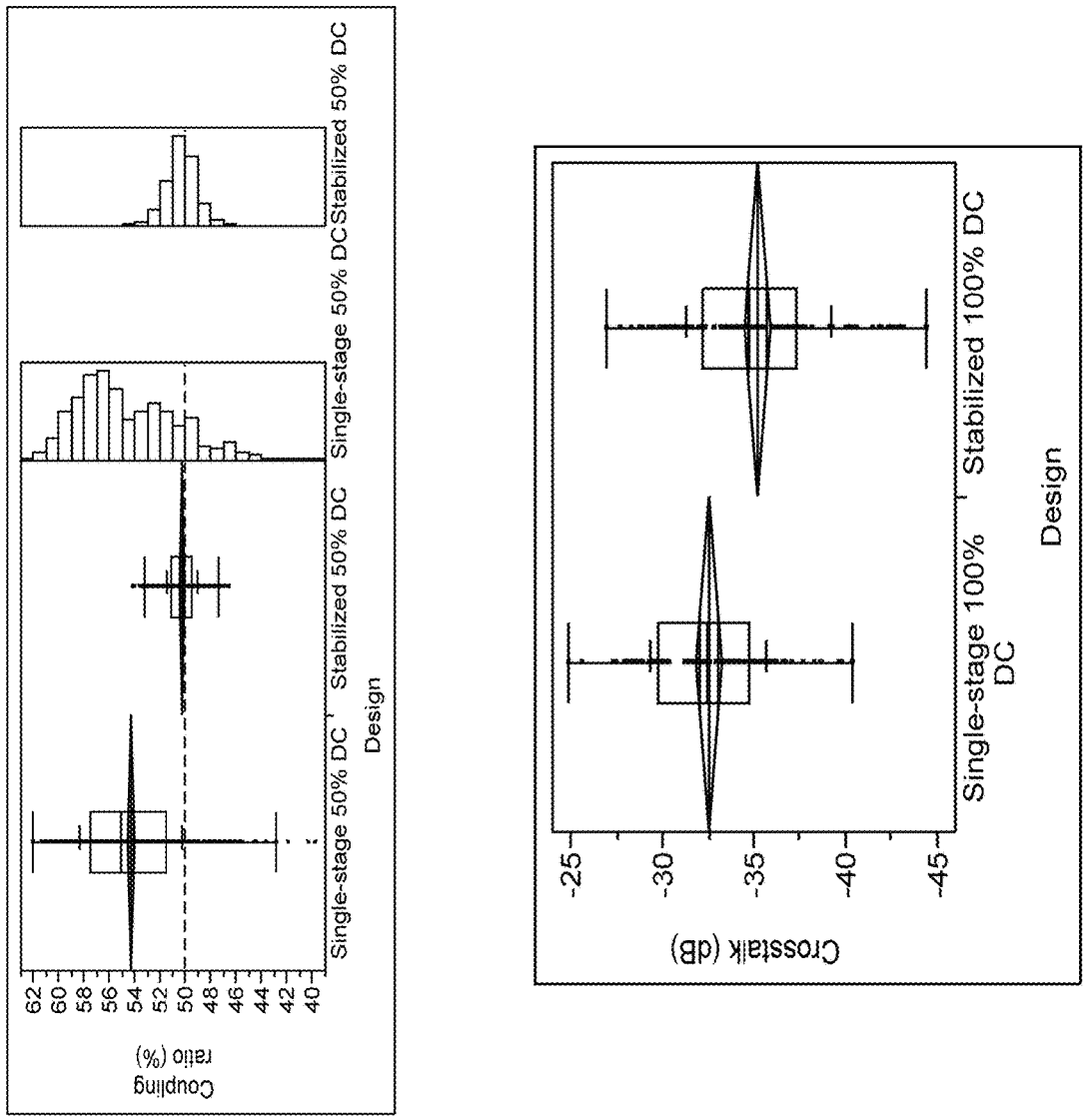

FIG. 8E shows experimental results for a 50% directional coupler design, comparing results between a single stage and a stabilized directional coupler, where the stabilized structures show coupling ratio percentages of near 50% compared to the single stage directional coupler that results in 54.5% with significantly higher variability across the wafer for the single stage directional couplers, as shown by the distribution plot to the right.

Table 1 summarizes the performance improvement for the stabilized DC designs, showing the standard deviation of coupling ratio for single-stage and stabilized directional coupler designs.

| Target coupling ratio | Single-stage DC standard deviation | Stabilized DC standard deviation | Reduction in variability |
| --- | --- | --- | --- |
| 1% | 0.29% | 0.12% | 2.4 |
| 2% | 0.49% | 0.15% | 3.3 |
| 5% | 0.99% | 0.27% | 3.7 |
| 10% | 1.59% | 0.48% | 3.3 |
| 50% | 4.11% | 1.21% | 3.4 |

FIG. 8F shows experimental results for a stabilized 100% directional coupler, which may be used as an alternative to a waveguide crossing. Waveguide crossings add flexibility for routing light on a chip. A directional coupler with a coupling ratio of 100% may be used as an alternative for a waveguide crossing. When a 100% directional coupler is used as a waveguide crossing, the small amount of the light that is not coupled over (due to small variations in device dimensions) may be considered crosstalk. A stabilized 100% directional coupler, consisting of a 100% directional coupler $$\left(\phi_1 = \frac{\pi}{2}\right)$$

and a 0% directional coupler ($\phi_2=\pi$) may reduce crosstalk, as illustrated in FIG. 8F. The 0% directional coupler used in this example embodiment is a directional coupler with the correct waveguide spacing and length so that all light is nominally coupled over to the other waveguide and then back, resulting in a coupling ratio of 0%.

In an example embodiment, a method and system are disclosed for stabilized directional couplers. In this regard, aspects of the invention may comprise by first and second waveguides, where one of the first and second waveguides may comprise a length extender between the first and second directional couplers, and the first and second directional couplers may be formed by reduced spacing between the first and second waveguides on opposite sides of the length extender. An input optical signal may be communicated into one of the first and second waveguides, at least a portion of the input optical signal may be coupled between the first and second waveguides in the first directional coupler and at least a portion of the coupled optical signal may be coupled between the first and second waveguides in the second directional coupler.

Optical signals may be communicated out of the stabilized directional coupler, where magnitudes of the optical signals communicated out of the stabilized directional coupler may be at a desired percentage of the input optical signal. The length extender may add phase delay for signals in the one of the first and second waveguides. The desired percentage may be based on the reduced spacing and a size of the length extender. The system may comprise a 2×2 or a 1×3 splitter.

The system may comprise a 1/N splitter, where 1/N represents the signal strength at each output of the splitter. A magnitude of the input optical signal may be monitored utilizing a photodiode in a loop formed by one of the first or second waveguides. The optical signals communicated out of the stabilized directional coupler may be modulated before communicating the modulated optical signals to a second stabilized directional coupler formed by the first and second waveguides and comprising a second length extender. The optical signals may be modulated utilizing phase modulators in each of the first and second waveguides. The stabilized directional coupler may be integrated in a Complementary Metal-Oxide Semiconductor (CMOS) chip.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, a device/module/circuitry/ etc. is "operable" to perform a function whenever the device/module/circuitry/etc. comprises the necessary hardware and code (if any necessary) to perform the function, regardless of whether performance of the function is disabled, or not enabled, by some user-configurable setting.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for communication, the method comprising:
in a system comprising a first directional coupler, a second directional coupler, a first waveguide, and a second waveguide, wherein the first waveguide comprises a length extender increasing a length of the first waveguide with respect to the second waveguide between said first and second directional couplers, wherein the first directional coupler has a targeted coupling of 100 percent while the second directional coupler has a targeted coupling of 100-X percent, where X is a non-zero value:
communicating an optical signal into only one of said first and second waveguides to direct the optical signal into the first directional coupler; and
coupling at least a portion of said optical signal between said first and second waveguides in said first directional coupler, transmitting the optical signal to the second directional coupler, and coupling at least a portion of the optical signal between said first and second waveguides in said second directional coupler.

2. The method according to claim 1, wherein the length extender has a length that results in a phase difference of 2*n*pi plus a constant value, where n is an integer.

3. The method according to claim 2, wherein the constant value is near 3.

4. The method according to claim 1, wherein said system comprises a 2×2 splitter.

5. The method according to claim 1, wherein said system comprises a 1×3 splitter.

6. The method according to claim 1, wherein said system comprises a 1/N splitter with N outputs, wherein 1/N represents a fractional output intensity at each output of the 1/N splitter.

7. The method according to claim 1, comprising monitoring a magnitude of said optical signal utilizing a photodiode in a loop comprising one of said first or second waveguides.

8. The method according to claim 1, comprising modulating optical signals communicated out of said system before communicating said modulated optical signals to a second system comprising said first and second waveguides and a second length extender.

9. The method according to claim 8, wherein said optical signals are modulated utilizing phase modulators in each of said first and second waveguides.

10. The method according to claim 1, wherein the first directional coupler, the second directional coupler, the first waveguide, and t h e second waveguide are part of a stabilized X % directional coupler.

11. A system for communication, the system comprising:
a first directional coupler, a second directional coupler, a first waveguide, and a second waveguide, wherein the first waveguide comprises a length extender increasing a length of the first waveguide with respect to the second waveguide between said first and second directional couplers, wherein said first directional coupler has a targeted coupling of 100 percent while the second directional coupler has a targeted coupling of 100-X percent where X is a non-zero value, said system being operable to:

receive an optical signal into only one of said first and second waveguides to direct the optical signal into the first directional coupler; and couple at least a portion of said optical signal between said first and second waveguides in said first directional coupler, transmit the optical signal to the second directional coupler, and couple at least a portion of the optical signal between said first and second waveguides in said second directional coupler.

12. The system according to claim 11, wherein the length extender has a length that results in a phase difference of 2*n*pi plus a constant value, where n is an integer.

13. The system according to claim 12, wherein the constant value is near 3.

14. The system according to claim 11, wherein said system comprises a 2×2 splitter.

15. The system according to claim 11, wherein said system comprises a 1×3 splitter.

16. The system according to claim 11, wherein said system comprises a 1/N splitter with N outputs, wherein 1/N represents a fractional output intensity at each output of the 1/N splitter.

17. The system according to claim 14, wherein a photodiode in a loop comprising one of said first or second waveguides is operable to monitor a magnitude of said optical signal.

18. The system according to claim 11, wherein said system is coupled to phase modulators in said first and second waveguides and a second system comprising said first and second waveguides and comprising a second length extender, wherein said phase modulators are operable to modulate optical signals communicated out of said system before said optical signals are communicated to said second system.

19. The system according to claim 11, wherein the first directional coupler, the second directional coupler, the first waveguide, and t h e second waveguide are part of a stabilized X % directional coupler.

20. A system for communication, the system comprising:
a first directional coupler, a second directional coupler, a first waveguide, a second waveguide, and a third waveguide, wherein:
said first waveguide comprises a first length extender and said third waveguide comprises a second length extender;
said first and second length extenders being located between said first and second directional couplers; and
said first directional coupler has a targeted 100 percent coupling from the second waveguide to the first and third waveguides and the second directional coupler has a targeted 33 percent coupling of input light back to the second waveguide, the system being operable to:
receive an optical signal into said second waveguide to direct the optical signal into the first directional coupler;
couple at least a portion of said optical signal between said second waveguide and said first waveguide in said first directional coupler and couple at least a portion of the optical signal between said second waveguide and said third waveguide;
transmit the optical signal to the second directional coupler; and
couple at least a portion of said coupled optical signals in said first and third waveguides back to said second waveguide in said second directional coupler such that optical signals communicated out of said 1×3 directional coupler are each the same as said input optical signal but each are at equal magnitudes that are ⅓ the magnitude of said input optical signal.

* * * * *

UNITED STATES PATENT AND TRADEMARK OFFICE
CERTIFICATE OF CORRECTION

PATENT NO. : 11,143,816 B2
APPLICATION NO. : 16/460471
DATED : October 12, 2021
INVENTOR(S) : Lieven Verslegers et al.

Page 1 of 1

It is certified that error appears in the above-identified patent and that said Letters Patent is hereby corrected as shown below:

On the Title Page

In item (74), in Column 2, in "Attorney, Agent, or Firm", Line 1, delete "Shendan," and insert -- Sheridan, --, therefor.

In the Drawings

On sheet 12 of 14, in Figure 8A-8B, Line 26, delete "FIG." and insert -- FIGS. --, therefor.

On sheet 13 of 14, in Figure 8C-8D, Line 25, delete "FIG." and insert -- FIGS. --, therefor.

On sheet 14 of 14, in Figure 8E-8F, Line 23, delete "FIG." and insert -- FIGS. --, therefor.

In the Specification

In Column 2, Line 9, after "disclosure" insert -- . --.

In Column 8, Line 24, delete "then then" and insert -- then --, therefor.

In the Claims

In Column 12, Line 60, in Claim 10, delete "t h e" and insert -- the --, therefor.

In Column 14, Line 6, in Claim 19, delete "t h e" and insert -- the --, therefor.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*